United States Patent [19]

Meston

[11] Patent Number: 5,526,999

[45] Date of Patent: Jun. 18, 1996

[54] SPACECRAFT WITH A CREW ESCAPE SYSTEM

[76] Inventor: Vyacheslav A. Meston, Altufievskoe Shosse, d.86, kv. 275, Moscow, Russian Federation, 127349

[21] Appl. No.: 256,295

[22] PCT Filed: Aug. 4, 1993

[86] PCT No.: PCT/RU93/00184

§ 371 Date: Jun. 29, 1994

§ 102(e) Date: Jun. 29, 1994

[87] PCT Pub. No.: WO94/10035

PCT Pub. Date: Mar. 11, 1994

[30] Foreign Application Priority Data

Nov. 3, 1992 [RU] Russian Federation ............ 92003493

[51] Int. Cl.$^6$ .................................................. B64C 37/02
[52] U.S. Cl. .............................. 244/2; 244/1 N; 244/52; 244/160; 244/118.5; 244/140; 244/46; 244/12.3; D12/341
[58] Field of Search ................................ 244/2, 160, 162, 244/118.5, 140, 141, 1 N, 12.3, 15, 52, 100 R, 73 R, 102 R, 75 R, 74; D12/319, 333, 341; 102/287

[56] References Cited

U.S. PATENT DOCUMENTS

| | | |
|---|---|---|
| 2,684,219 | 7/1954 | Thunbo . |
| 2,981,499 | 4/1961 | Janney, II . |
| 3,054,584 | 9/1962 | Andras . |
| 3,493,197 | 2/1970 | Spearman .................................. 244/46 |
| 3,999,728 | 12/1976 | Zimmer ...................................... 244/2 |
| 4,343,446 | 8/1982 | Langley . |
| 4,650,139 | 3/1987 | Taylor et al. . |
| 4,729,528 | 3/1988 | Borzachillo ........................... 244/75 R |
| 4,802,639 | 2/1989 | Hardy et al. ........................ 244/158 R |

FOREIGN PATENT DOCUMENTS

| | | |
|---|---|---|
| 2634454 | 1/1990 | France . |
| 2200877 | 8/1988 | United Kingdom ................... 244/140 |

OTHER PUBLICATIONS

"Astronautika i raketodinamika," No. 38, 1990, VINITI, (Moscow), pp. 1,13.
"Astronautika i raketodinamika," No. 46, 1980, VINITI, (Moscow), pp. 1,5.
"Novelties of Science and Technology Abroad," *Aerospace and Rocket Engineering*, 1988, No. 13, Joukovski Central Aerodynamic Inst., Moscow pp. 3–4 (in Russian).
"News from Abroad," Moscow, 1986, No. 27 (1356), pp. 12–14 (in Russian).
"Novelties of Science and Technology Abroad," *Aerospace and Rocket Engineering*, 1988, No. 13, Joukovski Central Aerodynamic Inst., Moscow pp. 12–14 (in Russian).

*Primary Examiner*—Andres Kashnikow
*Assistant Examiner*—Tien Dinh
*Attorney, Agent, or Firm*—Collard & Roe

[57] ABSTRACT

The spacecraft comprises a fuselage (1), a wing (2), a power unit incorporating two liquid-propellant launching rocket engines (3), two liquid-propellant boost rocket engines (4), six transverse-thrust rocket engines (5) located in the spacecraft fuselage (1) on a rotatable ring (6), solid-propellant emergency deceleration rocket engines (7), and solid-propellant additional boosting rocket engines (8), a payload compartment (9), a crew compartment (10), a tail unit with two vertical fin struts (11) a bottom tailplane (12), and a top tailplane (13). The fuselage (1) is provided with a movable center conical body (14). The spacecraft landing gear has a swivelling tail wheel (21). The crew compartment (10) is interposed between the fin struts (11) under the top tailplane (13). The spacecraft is provided with an orbital maneuvering system whose final control elements are in fact low-thrust rocket engines (22) and (23), and gyrodynes. The crew escape system comprises an escape module (24) which is in fact a recoverable ballistic capsule held to the end face of the tail portion of the fuselage (1). The capsule (24) communicates with the crew compartment (10) through a tunnel (25) provided with means for crew transfer from the crew compartment (10) to the capsule (24). The capsule (24) has a front and a rear hatch, an aerodynamic decelerator, and a parachute system. The front portion of the capsule (24) has a heat-protective coating (36). The center of mass of the capsule is displaced towards its front portion.

6 Claims, 6 Drawing Sheets

5,526,999

SPACECRAFT WITH A CREW ESCAPE SYSTEM

TECHNICAL FIELD

The invention relates in general to space engineering and more specifically to reusable spacecraft providing crew escape in case of emergency while in orbital flight.

BACKGROUND ART

One state-of-the-art single-stage reusable aerospace vehicle is known to comprise a fuselage incorporating a crew cabin and a payload compartment, a landing gear, a variable-sweep wing, a vertical tail, a power plant, an orbital maneuvering system, and a crew escape system (cf "Novosti zarubezhnoi tekhniki" (Novelties of science and technology abroad) ,Aerospace and rocket engineering, 1988, No.13 Issued by the Joukovski Central aerodynamic institute, Moscow, p.p. . 3–4 (in Russian).

One more state-of-the-art single-stage reusable aerospace vehicle is known to comprise a fuselage provided with a crew compartment, a payload compartment, and a center conical body, a landing gear incorporating a multiwheel bogey and a nose wheel, a variable-sweep wing, a power plant, an orbital maneuvering system with final control elements, and a crew escape system with an escape module (cf. the newspaper "Za rubezhom" (News from abroad), Moscow, 1986,No.27(1356),pp.12–14(in Russian).

In the aforementioned known single-stage reusable aerospace vehicles the fuselage internal volume is used inadequately efficiently for payload stowage due to accommodation of the power plant in the vehicle fuselage. Said vehicles require a substantially longer runway for taking-off and landing; the vehicle has a low climbing rate because its climbing is effected only due to wing lift. In addition, the heretofore-known constructions of aerospace vehicles are not provided with a crew escape system in case of emergency while in an orbital flight; they are inadequately maneuverable in an orbital flight; their movability over the airfield of a home airdrome is restricted.

One prior-art crew escape system of a single-stage reusable aerospace vehicle, comprising an escape module and an ejection mechanism of said escape module. The escape module is provided with means for crew accommodation, life support, power supply, as well as an alighting gear incorporating an aerodynamic decelerator and a parachute landing system provided with soft landing engines (cf. "Novosti zarubezhnoi tekhniki" (Novelties of science and technology abroad), Aerospace and rocket engineering, 1988, No.13, Issued by the Joukovski Central Aerohydrodynamic institute, Moscow, pp. 12–14 (in Russian).

The aforementioned crew escape system is applicable only in the atmosphere, that is, during orbital injection of the vehicle and its return to the Earth.

DISCLOSURE OF THE INVENTION

It is a primary and essential object of the present invention to provide a spacecraft featuring more efficient utilization of the internal volume of its fuselage, higher climbing rate of the vehicle and better orbital maneuverability , requiring a shorter runway and having increased movability over the airfield of a home airdrome. As far as the invention crew escape system of the proposed vehicle is concerned, the object of the is to provide crew escape in case of emergency while in an orbital flight.

The foregoing object is accomplished due to the fact that in a single-stage aerospace vehicle, comprising a fuselage provided with a crew compartment, a payload compartment, and a center conical body located in the nose fuselage portion, a landing gear appearing as a multiwheel bogey and a nose wheel, a variable-sweep wing, a power plant, an orbital maneuvering system provided with final control elements, and a crew escape system provided with an escape module, the power plant is partly brought outside the fuselage and comprises two launching rocket engines and two boost rocket engines mounted pairwise on the outer wing panels symmetrically relative to the vehicle fore-and-aft axis, two solid-propellant additional boosting rocket engines and two solid-propellant emergency deceleration rocket engines arranged pairwise in a common casing with the nozzles facing oppositely and situated on the tips of the outer wing panels, six liquid-propellant transverse-thrust rocket engines located in the vehicle fuselage on a rotatable ring and spaced equidistantly therealong, the center of the ring coinciding with the vehicle center of mass; production doors are provided in the upper portion of the vehicle fuselage for installing transverse-thrust engines, and an opening is made in the lower fuselage portion for the transverse-thrust engine exhaust gases to escape, said opening being provided with extensible sliding shutters and flame deflectors; the vehicle has a tail unit, incorporating a vertical tail made up of two spaced-apart fin struts, and a horizontal tail consisting of two parallel tailplanes, a top and a bottom of which the bottom tailplane is a variable (double) sweep one and is held to the vehicle fuselage, while the top tailplane is displaced with respect to the bottom tailplane towards the tail fuselage portion and is held to the ends of the fin struts(11); the crew compartment is interposed between the fin struts under the top tailplane, the final control elements of the orbital maneuvering system appear as low-thrust engines located at the tailplane tips, and gyrodynes mounted in the tip struts and at the tips of the outer wing panels; the center conical body is movable along the vehicle fore-and-aft axis and has a power actuator;the escape module of the crew escape system is located on the end face of the tail portion of the vehicle fuselage, while the launching and boost engines of the power plant are in fact liquid-propellant rocket engines, the low-thrust engines of the orbital maneuvering system are in effect solid-propellant rocket engines, and the landing gear of the vehicle is provided with a swiveling tail wheel.

As far as the crew escape system is concerned, the foregoing object is accomplished due to the fact that in a crew escape system of a single-stage reusable aerospace vehicle, comprising an escape module and an ejection mechanism of said module, said escape module is provided with means for crew accommodation, life support, power supply, and alighting gear incorporating an aerodynamic decelerator, and a parachute landing system provided with soft landing engines, said escape module is shaped as a capsule communicating with the crew compartment through a tunnel provided with a mechanism for crew transfer from the crew compartment to the capsule, the latter having a heat-protective coating, a retrorocket unit, and a jettisonable cowling, while the aerodynamic decelerator of the capsule is shaped as a number of spring-loaded strips hingejoined to the capsule casing, said strips when in folded position, adjoin the capsule casing and are kept in such a position by the jettisonable cowling and are provided with retainers of their expanded position.

BRIEF DESCRIPTION OF THE DRAWINGS

In what follows the invention is illustrated by the accompanying drawings, wherein.

BEST METHOD OF CARRYING OUT THE INVENTION

Figure 1:
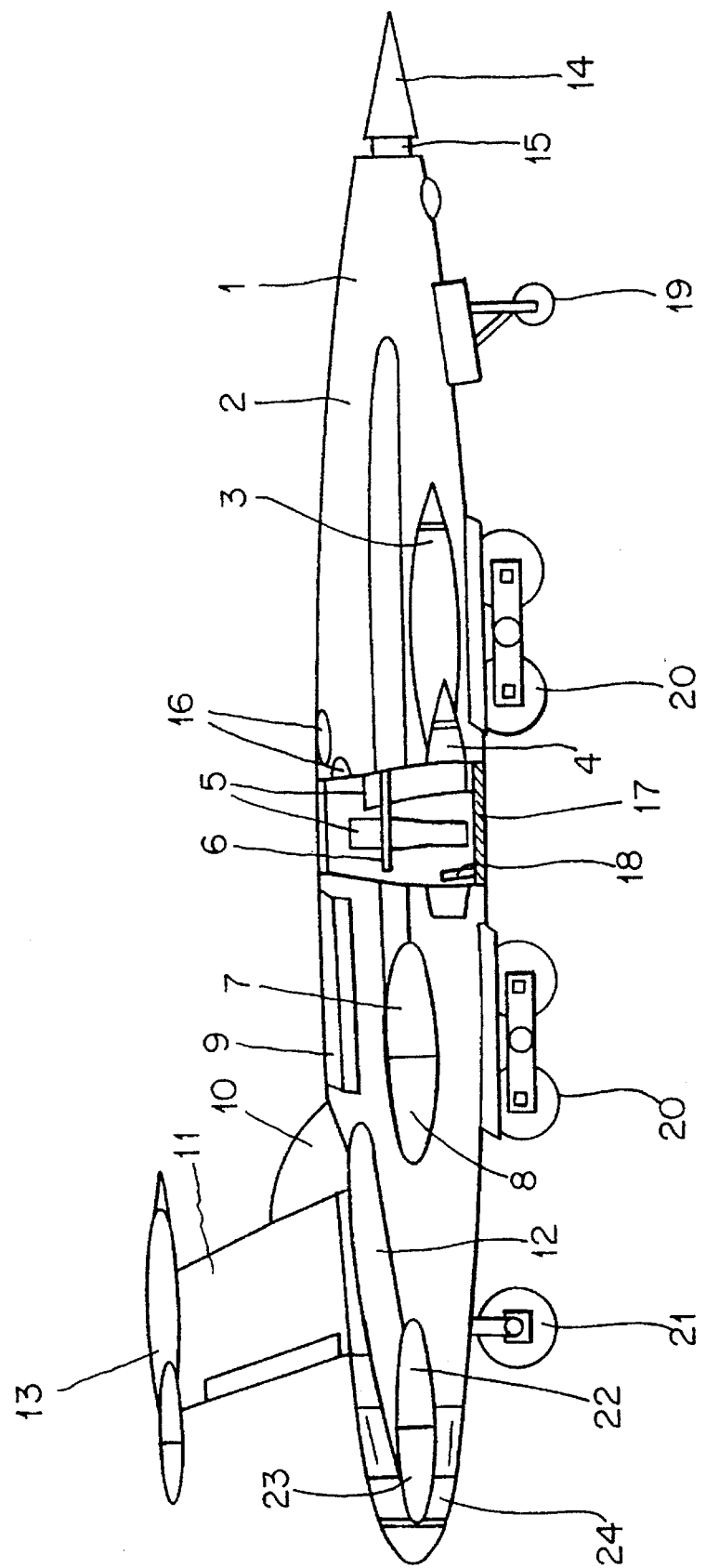
FIG. 1 is a general side view of the spacecraft of the present invention.
Figure 2:
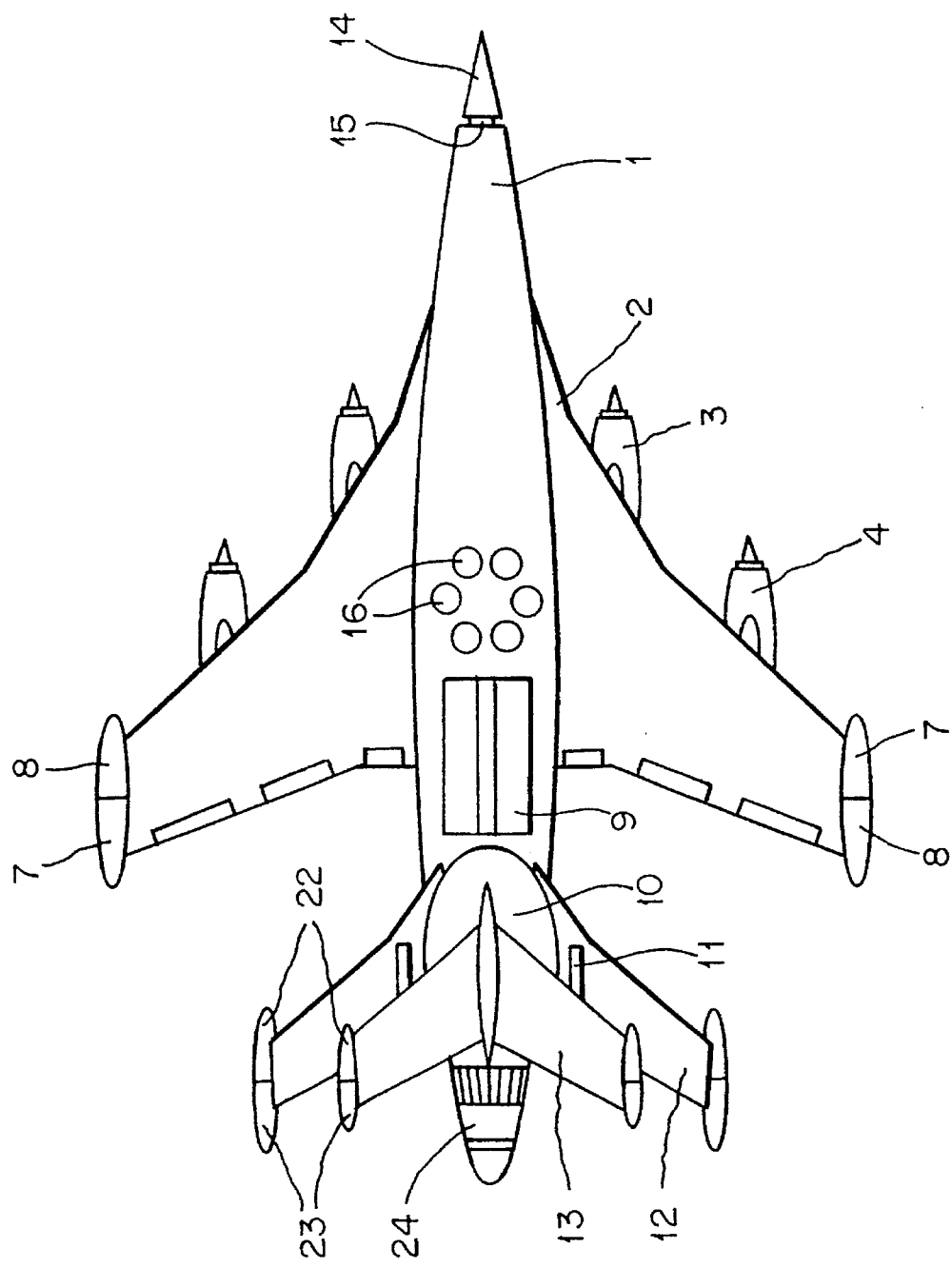
FIG. 2 is a plan view of FIG. 1.
Figure 3:
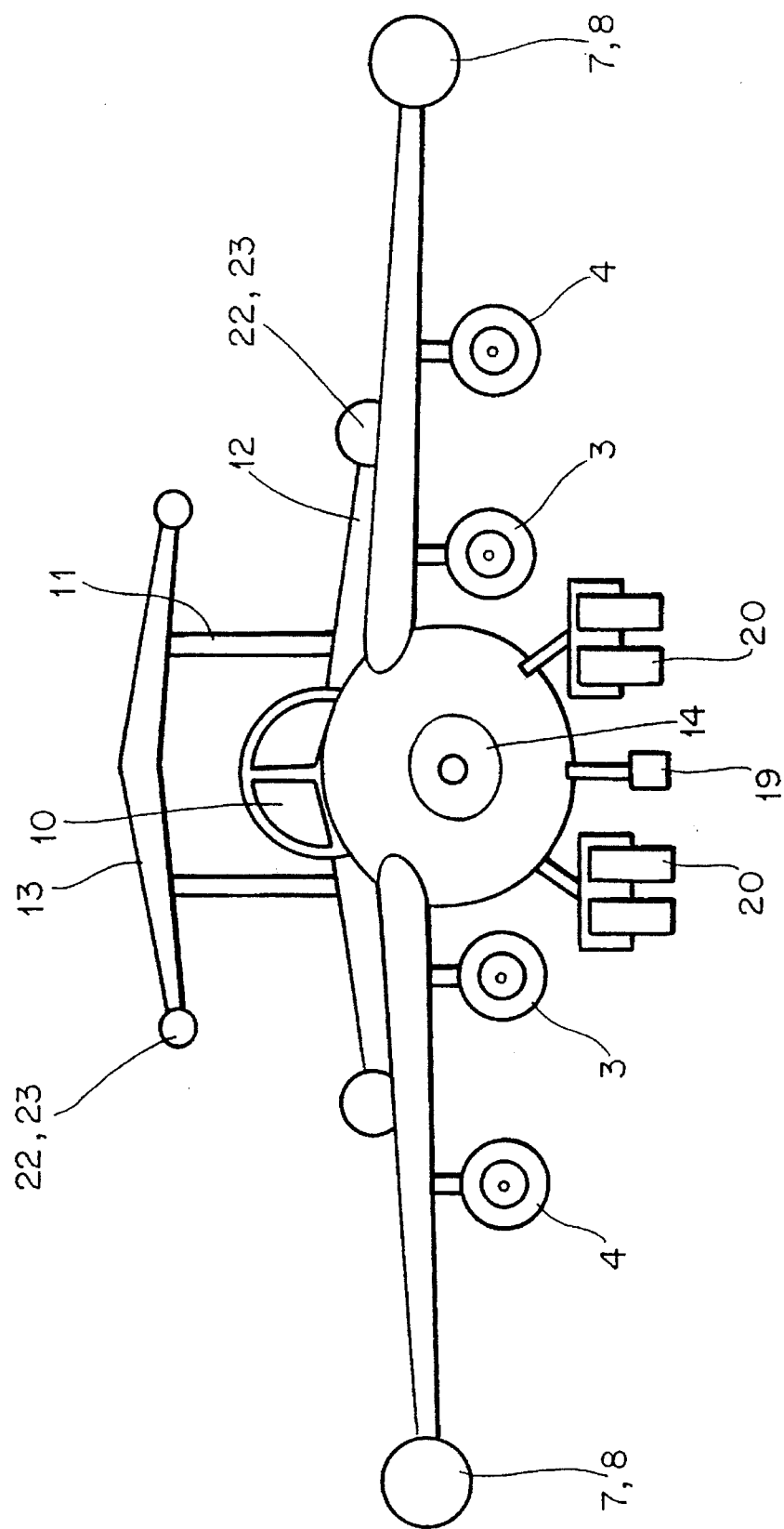
FIG. 3 is a front view of FIG. 1.

The spacecraft (FIGS. 1,2,3) comprises a fuselage 1, a variable-sweep wing 2, a power plant incorporating two liquid-propellant launching rocket engines 3, two liquid-propellant boost rocket engines 4, transverse-thrust rocket engines 5 located in the vehicle fuselage on a rotatable ring 6, solid-propellant emergency deceleration rocket engines 7, solid-propellant additional boosting rocket engines 8, a payload compartment 9, a crew compartment 10, a tail unit incorporating two vertical fin struts 11, a bottom tailplanes 12 held to the fuselage 1, and a top tailplane 13 secured at the ends of the fin struts 11 and displaced with respect to the bottom tailplane towards the tail portion of the fuselage 1.

A center conical body 14 is located in the nose portion of the fuselage 1 and is provided with a power actuator 15 for imparting longitudinal motion to said center body.

Production doors 16 are provided in the upper portion of the fuselage 1 for installing the transverse-thrust engines 5, and an opening is made in the lower portion of the fuselage 1 for exhaust gases of the transverse-thrust engines 5 to escape, said opening being provided with sliding shutters 17 and flame deflectors 18.

The spacecraft has a landing gear incorporating a nose wheel 19, a multiwheel bogey 20 and a swivelling tail wheel 21.

The spacecraft comprises an orbital maneuvering system having final control elements (or actuators) in the form of solid-propellant low-thrust rocket engines 22 and 23 mounted at the tips of the tailplanes 12 and 13, respectively, and gyrodynes (or power assisted gyro stabilizers) (not shown) located in the fin struts 11 and at the tips of the panels of the wing 2.

The spacecraft is provided with a crew escape system having an escape module 24 situated at the end of the tail portion of the fuselage 1.

The engines 3 and 4 of the power plant are held to the panels of the wing 2 on pylons.

The emergency deceleration engine 7 and the additional boosting engine 8 are mounted at the tips of the panels of the wing 2.

The crew compartment is situated in the tail portion of the fuselage 1 between the fin struts 11 under the top tailplane 13.

Figure 4:
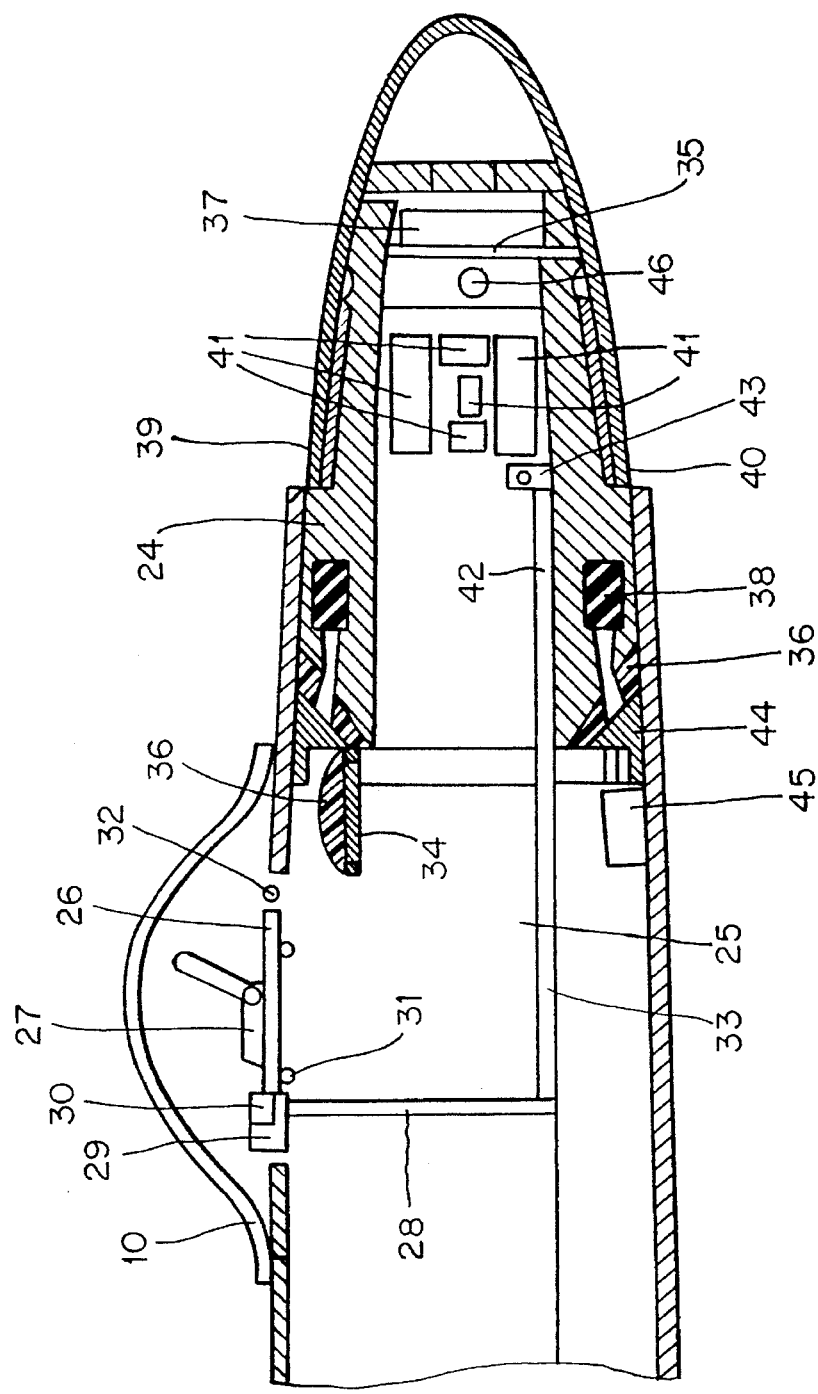
FIG. 4 shows a constructional arrangement of the crew escape system, according to the invention.

The crew escape system (FIG. 4) comprises an escape module 24 shaped as a ballistic recoverable capsule held to the end face of the tail portion of the fuselage 1 of the spacecraft through a releasable locking device (omitted in FIG. 4).

The interior of the capsule 24 communicates with the crew compartment 10 through a tunnel 25, wherein a mechanism for crew transferring from the compartment 10 to the capsule 24 is provided.

The aforesaid mechanism comprises a platform 26 on which airscrew seats 27 are mounted, which are provided with folding backs and a seat-folding actuator.

The platform 26 is vertically slidable on an upright 28 provided with a power actuator of the platform 26.

The platform 26 is associated with the power actuator 29 through a pusher-lock 30 and is provided with rolls 31.

The platform 26 is provided with a retainer 32 situated on its side opposite to the pusher-lock 30.

The floor of the tunnel 25 has a guide 33 for the rolls 31 of the platform to ride along.

The ballistic recoverable capsule 24 has hatches in its front and rear portions, respectively.

The front hatch has a door 34, the rear hatch has a door 35.

The door 24 of the rear hatch and the front portion of the capsule 24 are provided with a heat-protective coating 36.

The rear hatch door 35 accommodates a parachute system container 37.

The capsule 24 is provided with retrorockets 38 arranged along the periphery of its front portion.

An aerodynamic decelerator is provided on the outer side of the capsule 24, said decelerator being in fact a number of strips 39 hinge-joined to the casing and spring-forced thereagainst, provided with retainers of their expanded position, said strips being not shown in FIG. 4.

When in the initial position the strips 39 are pressed against the casing of the capsule 24 and fixed in position with a cowling 40 that encompasses the capsule casing.

The interior of the capsule 24 accommodates devices and apparatus 41 of the control, life support, and power supply systems.

The inner wall of the capsule 24 is provided with a guide 42 for the rolls 31 of the platform 26 to ride along, said guide being adapted to align with the guide 33 when joining the capsule 24 with the spacecraft.

A receving unit 43 is provided at the end of the guide 42, which comprises a locking device adapted to interact with the retainer 32 of the platform 26, and a platform swivelling mechanism (both of said device and said mechanism being omitted in FIG. 4).

A mechanism for ejection of the capsule 24 is provided in the tail portion of the spacecraft fuselage 1, comprising a ring 44 mounted in the spacecraft fuselage 1 movable along the fore-and-aft axis thereof, and three ejectors 45 adapted to interact with the ring 44.

The capsule 24 has windows 46 made in its rear portion.

In order to increase aerodynamic stability of the capsule during its descent in the dense atmospheric layers and to provide its vertical attitude during landing or alighting on water, the capsule center of mass its displaced towards its front portion.

The required buoyancy of the capsule is ensured by an appropriate unit.

The spacecraft of the present invention functions as follows.

The spacecraft can take off from an airfield runway or vertically.

In the former case the spacecraft starts and lifts off as a conventional aircraft, using liquid-propellant launching rocket engines 3, climbs out accelerates. At an altitude on the order of 20 km the liquid-propellant boost rocket engines 4 are fired and the spacecraft begins going to the path of orbital injection, while continuing climbing-out and gaining flight speed of the spacecraft.

At an altitude on the order of 50 km the liquid-propellant transverse-thrust rocket engines 5 are fired to ensure accelerated climbing-up and gaining flight speed, thus curtailing the time of the spacecraft injection into the calculated orbit.

In the latter case the spacecraft starts vertically using the liquid-propellant transverse-thrust rocket engines 5. Once the spacecraft has climbed a safe altitude the launching engines 3 are fired and a horizontal spacecraft acceleration is performed to the speed at which the wing lift starts functioning, whereupon the transverse-thrust engines 5 are shut down. The transverse-thrust engines 5 can also be used in this case as additional booster engines, for which purpose the axis of the engine 5 is deflected backward from the vertical using the rotatable ring 6, thereby bulging up the longitudinal thrust component. Further flight of the spacecraft proceeds in the same way as in the formed case.

Whenever necessary the solid-propellant additional boosting rocket engines 8 can be fired at any stage of the spacecraft injection into the orbit.

In case of emergency during take-off acceleration on the runway the launching engines 3 are shut down and an emergency spacecraft deceleration is carried out by firing the solid- propellant emergency deceleration rocket engines 7.

Once the spacecraft has been injected into the orbit, and orbital maneuvers aimed at orbital correction, as well as maneuvers for approaching to and docking with other space objects and for spacecraft attitude control are effected by firing some of the solid-propellant low-thrust rocket engines 22 and 23 and by using the gyrodynes or the transverse-thrust engines 5.

Descent from the orbit upon completion of an orbital flight is carried out as follows.

At the initial stage of descent the perigee altitude is reduced to about 70 km, for which purpose a deceleration impulse is imparted to the spacecraft by firing, for a preset time, the solid-propellant emergency deceleration rocket engines 7. As a result, the orbital speed of the spacecraft is reduced to the value on the order of 25M, whereupon the vehicle starts descending.

A relatively large spacecraft wing area enables vehicle descending at small atmospheric re-entry angles, whereby a considerable aerodynamic skin heating can be avoided.

The aforesaid purpose is also attained by the use of the center conical body 14 which makes it possible to shift forward the leading-edge shock wave developed during flight at hyper-sonic speeds, thereby transferring principal thermal load directly to the center conical body 14.

Thermal load relief of the spacecraft airframe is ensured by the fact that its wing 2 is a variable-sweep one.

To reduce the intensity and effective time of thermal load upon the spacecraft airframe members, the transverse-thrust engines 5 are fired as soon as the spacecraft starts descending from an altitude of about 70 km and the thrust vector is deflected forward,with the aid of the rotatable ring 6, in the direction of descent, whereby rapid cancelling of both the spacecraft ground speed and vertical velocity.

Once the spacearaft speed has been reduced to about 5–6M the transverse-thrust engines are shut down and the spacecraft continues flying to the landing area under glide conditions.

The spacecraft is enabled to perform runway landing in a conventional way, with subsequent deceleration using the emergency deceleration engines 7 and aerodynamic wing surfaces, as well as vertical landing using the transverse-thrust engines 5. In this case the engines 5 are fired before approaching to the landing area,the spacecraft horizontal speed is cancelled completely using the emergency deceleration engines 7 and by forward deflection of the thrust vector of the engine 5 in the direction of flight, whereupon the spacecraft is descended by a smooth reduction of the thrust of the engine 5 to land at a preselected area. Maneuvering during spacecraft take-off and landing for its taxiing to the runway and returning to the airfield parking area is effected with the use of the swivelling tail wheel 21.

Figure 5:
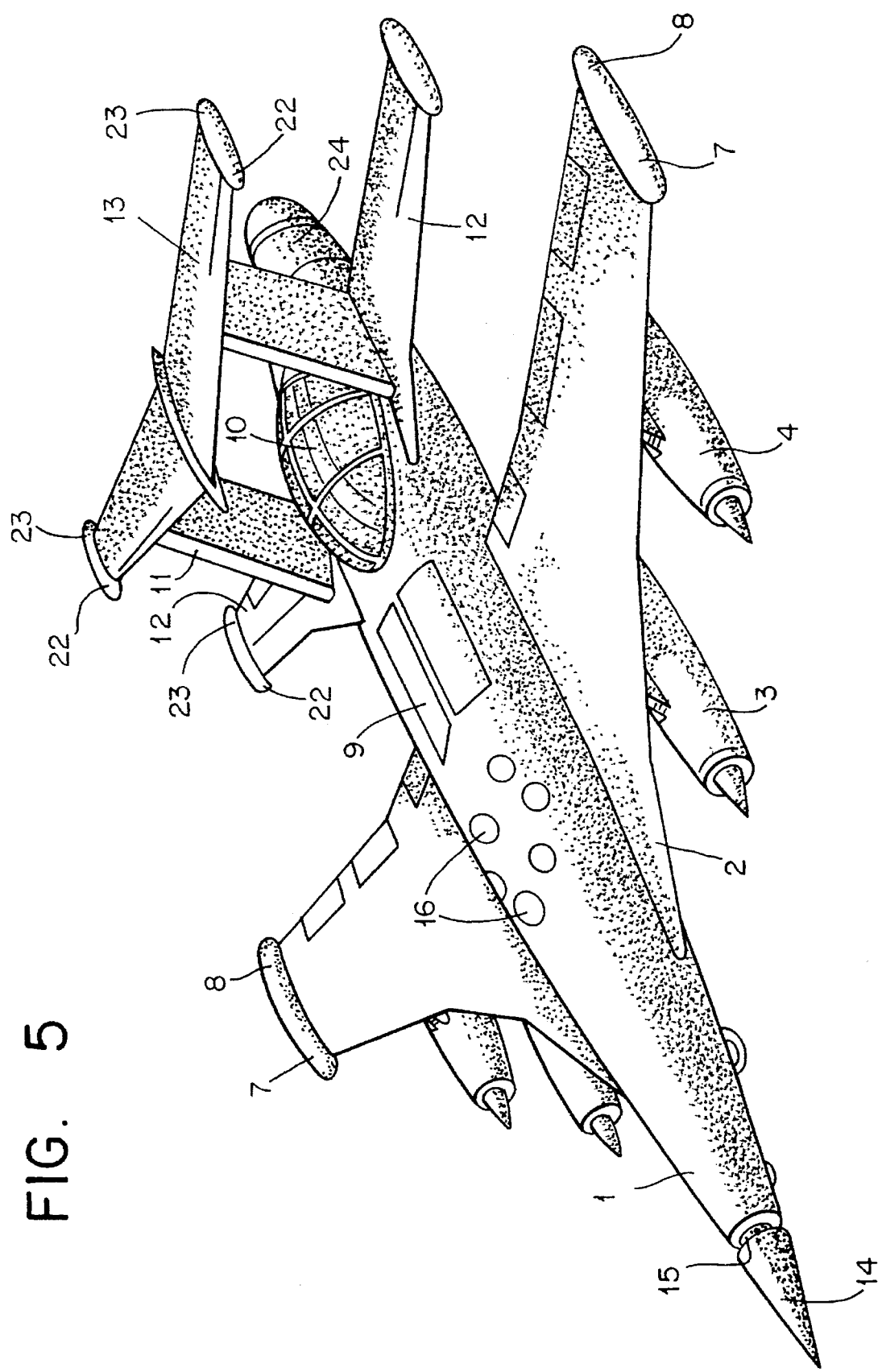
FIG. 5 shows a top front perspective view of the spacecraft.
Figure 6:
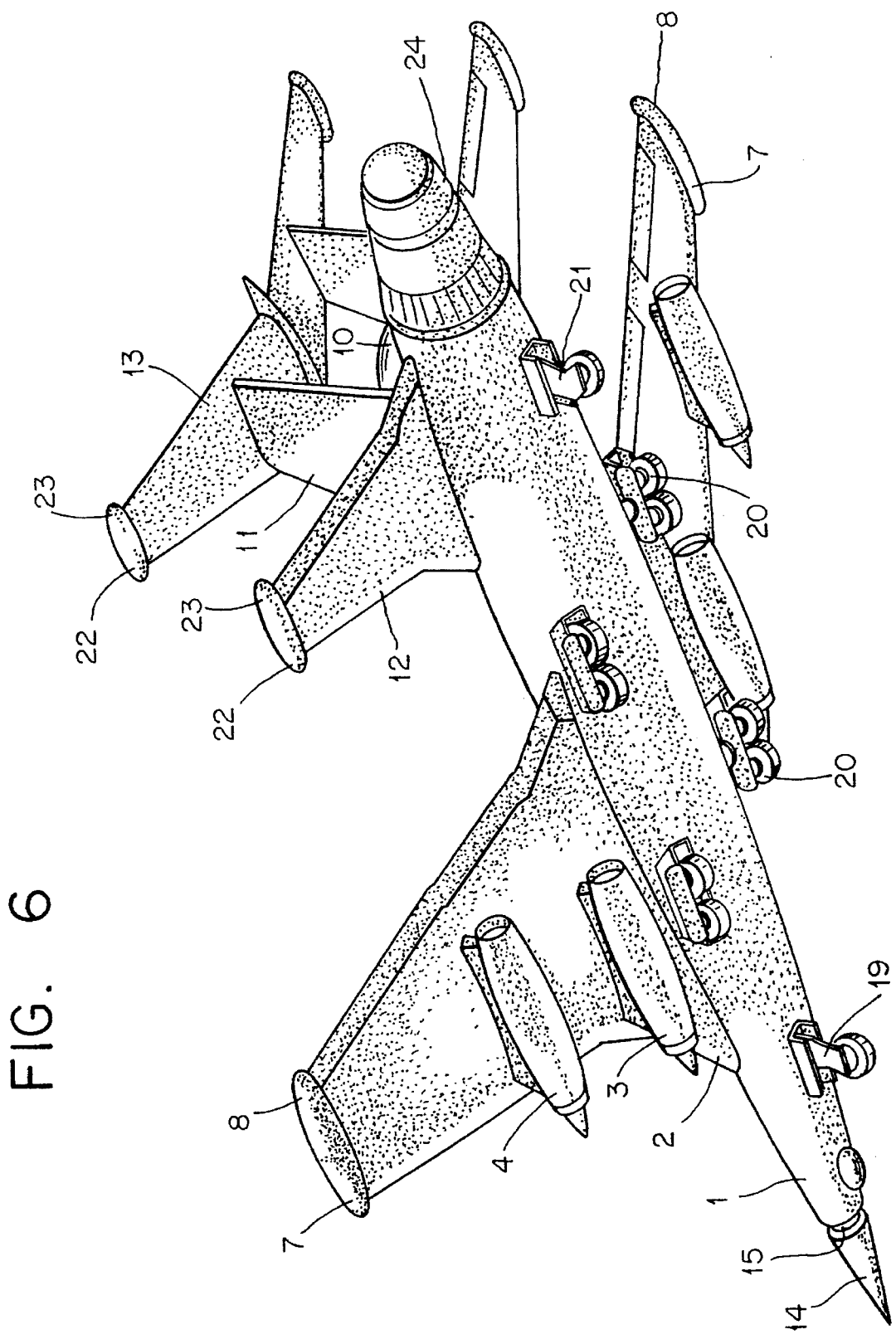
FIG. 6 shows a bottom rear perspective view of the spacecraft.

Referring to FIGS. 5 and 6, it can be seen that the actuators of the system of orbital maneuvering appear as low-thrust engine 22 and 23 located at the tips of the tailplanes 12, 13. Power-assisted gyro stabilizers are mounted in the fin struts 11, at the tips of the outboard panels of the wing 2, at the tips of outer sections of the tailplanes 12, 13, and in the supporting sections thereof. This is shown quite clearly in FIG. 5, wherein reference numerals f1, f2, and f3 respectively, indicate the single-, double-, and triple-stage gyrostabilizers.

The crew escape system of the spacecraft functions as follows. A command for actuation of the crew escape system is delivered either automatically or manually if an emergency situation is detected during spacecraft injection into the orbit or during an orbital flight, against the results of an automatic status monitoring of the spacecraft systems or checking by the spacecraft crew.

In response to the aforesaid command the seats 27 together with the crew members thereon are changed over to the horizontal position with respect to the floor of the compartment 10.

Concurrently the door 34 of the front hatch of the capsule 24 is opened.

The power actuator 29 is turned on, and the platform 26 together with the crew members thereon is lowered to the floor of the tunnel 25 so that the rolls 31 catch the guides 33.

Next the pusher-lock 30 operates to release the platform 26 and to move along the guides 33 and 42 to the capsule 24.

The retainer 32 of the platform 26 gets in the locking device of the receiving unit 43 of the capsule 24 and is held in position therein.

The door 34 of the front hatch is closed, after which the locking device associating the capsule 24 with the spacecraft fuselage 1 operates to release the capsule 24. This is followed by operation of the ejectors 45 of the capcule ejection mechanism which actuate the capsule 24 through the ring 44 to separate the capsule 24 from the spacecraft.

Thereafter the systems of the capsule 24 operate independently.

The capsule control system delivers a command for jettisoning the cowling 40, whereupon the retrorockets 38 are fired to impart a deceleration impulse to the capsule 24 for a predetermined period of time, whereby the capsule 24 is deorbited and goes to a ballistic descent trajectory.

Just after the completion of operation of the retrorockets 38 the mechanism for swivelling the platform 26 is turned on to set the latter square with the fore-and-aft axis of the capsule 24.

Once the cowling 40 has been jettisoned the strips 39 of the aerodynamic decelerator are released and the decelerator is thus unfolded.

Then the strips 39 are opened and fixed in the open position.

It is in such a position, i.e., with the front portion first that the capsule 24 enters the dense atmospheric layers.

The capsule 24 is decelerated largely due to interaction of its front portion provided with the heat-protective coating 36, with the atmosphere and due to the action of the aerodynamic decelerator which at the same time provides for a stabilized position of the capsule 24 during descent.

At an altitude of 8–10 km the door of the hatch of the parachute system container 37 is jettisoned and the parachute system is developed, which ensures descent of the capsule 24 and its soft landing. After landing the crew of spacecraft open the door 35 of the rear hatch of the capsule 24 to get out of it.

The crew escape system functions in a similar way in case of emergency during spacecraft injection into the orbit.

INDUSTRIAL APPLICABILITY

The present invention will find application for transporting useful loads from the Earth to space orbit objects and backwards, as well as for interorbital transportation and long-distance space trips.

I claim:

1. A spacecraft being a single-stage aerospace vehicle comprising:

a fuselage provided with a crew compartment;

a payload compartment;

a center conical body located in a nose portion of the fuselage; the center conical body is mounted movable along a vehicle fore-and-aft axis and has a power actuator;

a landing gear, incorporating a multiwheel bogey and a nose wheel;

a variable-sweep wing;

a power plant;

an orbital maneuvering system provided with actuators;

a crew escape system provided with an escape module (24); the escape module of the crew escape system is located on an end face of a tail portion of the vehicle fuselage;

wherein the power plant comprises two launching rocket engines and two boost rocket engines mounted pairwise on the outer wing panels symmetrically with respect to the vehicle fore-and-aft axis, two solid-propellant additional boosting rocket engines, and two solid-propellant emergency deceleration rocket engines arranged pairwise in a common casing with their nozzles facing opposite sides and located at the tips of the outer panels of the wing, six liquid-propellant transverse-thrust rocket engines located in the vehicle fuselage on a rotatable ring and spaced equidistantly along the ring periphery, the center of the ring coinciding with the center of mass of the vehicle; production doors are provided in the upper portion of the vehicle fuselage for installing the transverse-thrust engines, and an opening is made in the lower portion of the fuselage for the exhaust gases of the transverse-thrust engines to escape, said opening being provided with extensible sliding shutters and flame deflectors;

said vehicle a tail portion comprising two spaced-apart fin struts, and a horizontal tail consisting of two parallel tailplanes, being a top tailplane and a bottom tailplane, the bottom tailplane is a variable-sweep and is held to the vehicle fuselage, while the top tailplane is displaced with respect to the bottom tailplane towards the tail portion of the fuselage and is held to the ends of the fin struts;

said crew compartment is interposed between the fin struts under the top tailplane;

said actuators of the orbital maneuvering system are low-thrust rocket engines located at the tips of the tailplanes, and power assisted gyro stabilizers mounted in the fin struts and at the tips of the outer panels of the wing.

2. A spacecraft according to claim 1, wherein the launching engines and the boost engines of the power plant are liquid-propellant rocket engines.

3. A spacecraft according to claim 1, wherein the low thrust engines of the orbital maneuvering system are solid-propellant rocket engines.

4. A spacecraft according to claim 1, wherein the landing gear has a swiveling tail wheel.

5. A crew escape system for the spacecraft according to claim 1 comprising an escape module and an ejection mechanism of the escape module which is provided with means for crew accommodation, life support, power supply, and an aerodynamic decelerator and a parachute system which ensures a soft landing of the escape module;

said escape module being a recoverable ballistic capsule communicating with the crew compartment through a tunnel provided with a mechanism for crew transfer from the compartment to the capsule which is provided with a heat-protective coating, a retrorocket unit, and a jettisonable cowling.

6. A crew escape system according to claim 5, wherein the aerodynamic decelerator of the capsule is in fact a number of spring-loaded strips hinge-joined to the casing of the capsule and adjoining the capsule when in folded position, being kept in said position by the jettisonable cowling, the strips being provided with retainers of their expanded position.

* * * * *